United States Patent
Li et al.

(10) Patent No.: US 9,560,682 B2
(45) Date of Patent: Jan. 31, 2017

(54) METHODS AND APPARATUS FOR RESOURCE ALLOCATIONS TO SUPPORT PEER-TO-PEER COMMUNICATIONS IN CELLULAR NETWORKS

(75) Inventors: Junyi Li, Chester, NJ (US); Hua Wang, Bridgewater, NJ (US); Shailesh Patel, Bridgewater, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 12/940,268

(22) Filed: Nov. 5, 2010

(65) Prior Publication Data

US 2012/0117155 A1    May 10, 2012

(51) Int. Cl.
| | |
|---|---|
| G06F 15/16 | (2006.01) |
| H04W 76/02 | (2009.01) |
| H04W 72/04 | (2009.01) |
| H04W 72/12 | (2009.01) |
| G06Q 10/10 | (2012.01) |

(Continued)

(52) U.S. Cl.
CPC .......... *H04W 76/023* (2013.01); *G06Q 10/10* (2013.01); *H04L 29/08072* (2013.01); *H04W 72/02* (2013.01); *H04W 72/044* (2013.01); *H04W 72/0406* (2013.01); *H04W 72/0493* (2013.01); *H04W 72/06* (2013.01); *H04W 72/1257* (2013.01); *H04W 72/1263* (2013.01); *H04W 74/04* (2013.01); *H04W 72/042* (2013.01);

(Continued)

(58) Field of Classification Search
CPC ............. H04L 29/08072; G06Q 10/10; H04W 72/0406; H04W 72/10; H04W 72/1263; H04W 72/0493; H04W 72/02; H04W 72/044; H04W 72/1257; H04W 74/04

USPC ......... 370/329, 330; 709/205; 455/450, 451, 455/452.1, 455, 464, 509

See application file for complete search history.

(56) References Cited

U.S. PATENT DOCUMENTS

2003/0156553 A1 *   8/2003   Benveniste ........... H04W 74/04
                                                  370/317
2004/0233888 A1   11/2004   Bonta et al.

(Continued)

FOREIGN PATENT DOCUMENTS

| CN | 1889750 A | 1/2007 |
|---|---|---|
| CN | 101568124 A | 10/2009 |

(Continued)

OTHER PUBLICATIONS

Ban, Koichiro et al., "Group-based Ad-hoc Network for Multimedia Communications", National Institute of Standards and Technology, 5 pages.

(Continued)

*Primary Examiner* — Chris Parry
*Assistant Examiner* — Weiwei Stiltner
(74) *Attorney, Agent, or Firm* — James K. O'Hare

(57) ABSTRACT

A method of operating a wireless device associated with a first cell includes receiving information on a first set of resources for intracell peer-to-peer communication and on a second set of resources for intercell peer-to-peer communication. In addition, the method includes utilizing at least one of the first set of resources to communicate with a second wireless device within the first cell or the second set of resources to communicate with the second wireless device within a second cell based on the received information.

50 Claims, 7 Drawing Sheets

(51) Int. Cl.
*H04W 72/02* (2009.01)
*H04L 29/08* (2006.01)
*H04W 74/04* (2009.01)
*H04W 72/06* (2009.01)
*H04W 72/10* (2009.01)
*H04W 84/18* (2009.01)
*H04W 92/20* (2009.01)

(52) U.S. Cl.
CPC ........ *H04W 72/0426* (2013.01); *H04W 72/10* (2013.01); *H04W 84/18* (2013.01); *H04W 92/20* (2013.01)

(56) References Cited

U.S. PATENT DOCUMENTS

| | | | |
|---|---|---|---|
| 2005/0276258 A1* | 12/2005 | Gu | 370/349 |
| 2006/0246906 A1* | 11/2006 | Vaittinen et al. | 455/442 |
| 2007/0140191 A1 | 6/2007 | Kojima | |
| 2007/0211677 A1 | 9/2007 | Laroia et al. | |
| 2007/0274280 A1* | 11/2007 | Haas et al. | 370/348 |
| 2008/0037487 A1 | 2/2008 | Li et al. | |
| 2008/0069063 A1 | 3/2008 | Li et al. | |
| 2009/0016232 A1 | 1/2009 | Kwon et al. | |
| 2009/0016456 A1* | 1/2009 | Li et al. | 375/260 |
| 2009/0059846 A1 | 3/2009 | Burgess et al. | |
| 2009/0268684 A1* | 10/2009 | Lott et al. | 370/329 |
| 2010/0002725 A1* | 1/2010 | Oh et al. | 370/468 |
| 2010/0111036 A1* | 5/2010 | Iwamura | 370/331 |
| 2010/0142471 A1* | 6/2010 | Cheng et al. | 370/329 |
| 2010/0169498 A1 | 7/2010 | Palanki et al. | |
| 2010/0173631 A1* | 7/2010 | Kim et al. | 455/436 |
| 2013/0059583 A1* | 3/2013 | Van Phan | H04W 72/04 455/435.1 |

FOREIGN PATENT DOCUMENTS

| | | |
|---|---|---|
| JP | 2006526368 A | 11/2006 |
| WO | WO-2004105409 A1 | 12/2004 |
| WO | WO2005053347 A1 | 6/2005 |
| WO | WO-2006134562 A2 | 12/2006 |
| WO | WO-2007082242 | 7/2007 |
| WO | WO2010102668 A1 | 9/2010 |

OTHER PUBLICATIONS

International Search Report and Written Opinion—PCT/US2011/058422—ISA/EPO—Mar. 6, 2012.

* cited by examiner

METHODS AND APPARATUS FOR RESOURCE ALLOCATIONS TO SUPPORT PEER-TO-PEER COMMUNICATIONS IN CELLULAR NETWORKS

BACKGROUND

Field

The present disclosure relates generally to communication systems, and more particularly, to resource allocations to support peer-to-peer communications in cellular networks.

Background

Wireless communication devices in a wide area network (WAN) may communicate with each other through their serving base stations. If the wireless communication devices are in close proximity to each other, they may communicate directly with each other using peer-to-peer communication, such as FlashLinQ. Methods and an apparatus for resource allocations to support peer-to-peer communications in cellular networks are needed in order to improve the efficiency of both peer-to-peer and WAN communications.

SUMMARY

In an aspect of the disclosure, a method of operating a wireless device associated within a first cell includes receiving information on a first set of resources for intracell peer-to-peer communication and on a second set of resources for intercell peer-to-peer communication. In addition, the method includes utilizing at least one of the first set of resources to communicate with a second wireless device within the first cell or the second set of resources to communicate with the second wireless device within a second cell based on the received information.

In an aspect of the disclosure, an apparatus associated with a first cell for wireless communication includes a processing system. The processing system is configured to receive information on a first set of resources for intracell peer-to-peer communication and on a second set of resources for intercell peer-to-peer communication. In addition, the processing system is configured to utilize at least one of the first set of resources to communicate with a second apparatus within the first cell or the second set of resources to communicate with the second apparatus within a second cell based on the received information.

In an aspect of the disclosure, an apparatus associated with a first cell includes means for receiving information on a first set of resources for intracell peer-to-peer communication and on a second set of resources for intercell peer-to-peer communication. In addition, the apparatus includes means for utilizing at least one of the first set of resources to communicate with a second apparatus within the first cell or the second set of resources to communicate with the second apparatus within a second cell based on the received information.

In an aspect of the disclosure, a computer program product in a wireless device associated with a first cell includes a computer-readable medium. The computer-readable medium includes code for receiving information on a first set of resources for intracell peer-to-peer communication and on a second set of resources for intercell peer-to-peer communication. In addition, the computer-readable medium includes code for utilizing at least one of the first set of resources to communicate with a second wireless device within the first cell or the second set of resources to communicate with the second wireless device within a second cell based on the received information.

DETAILED DESCRIPTION

Figure 1:
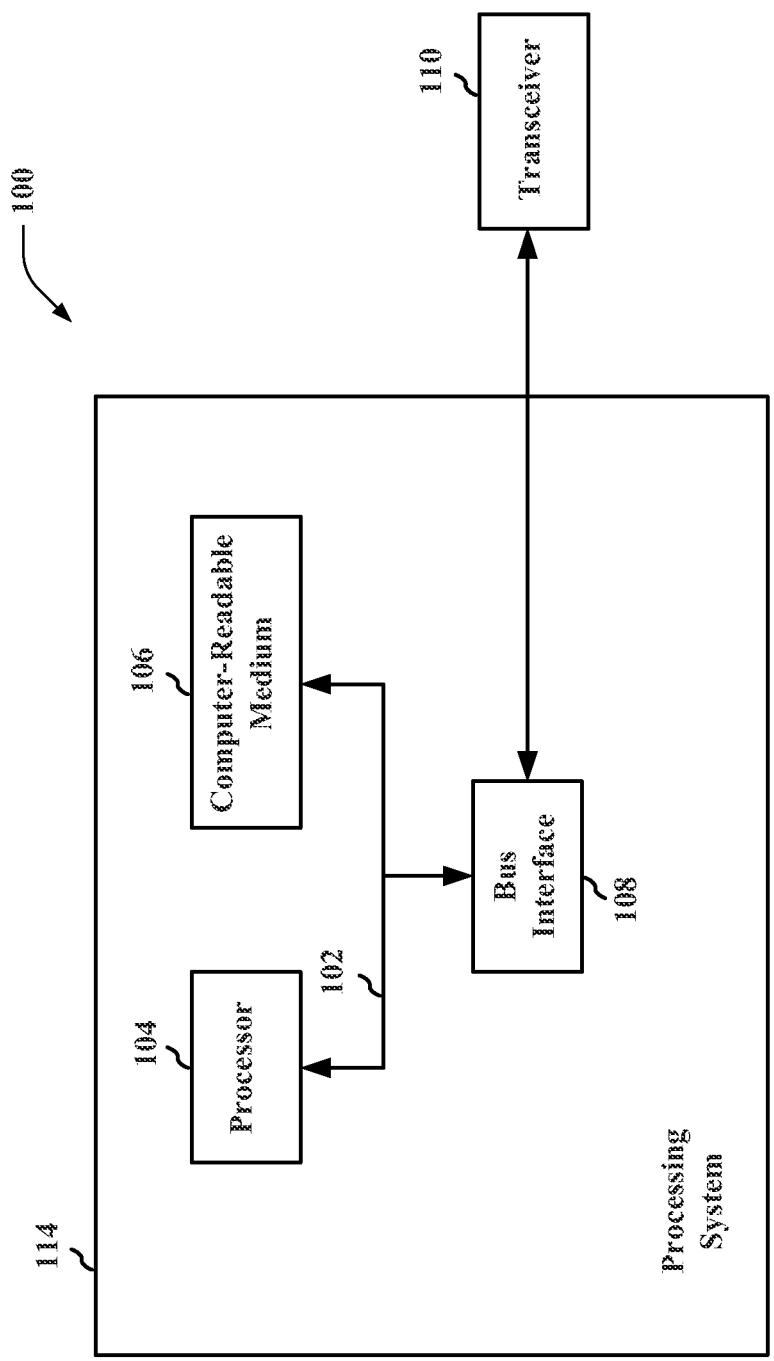
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
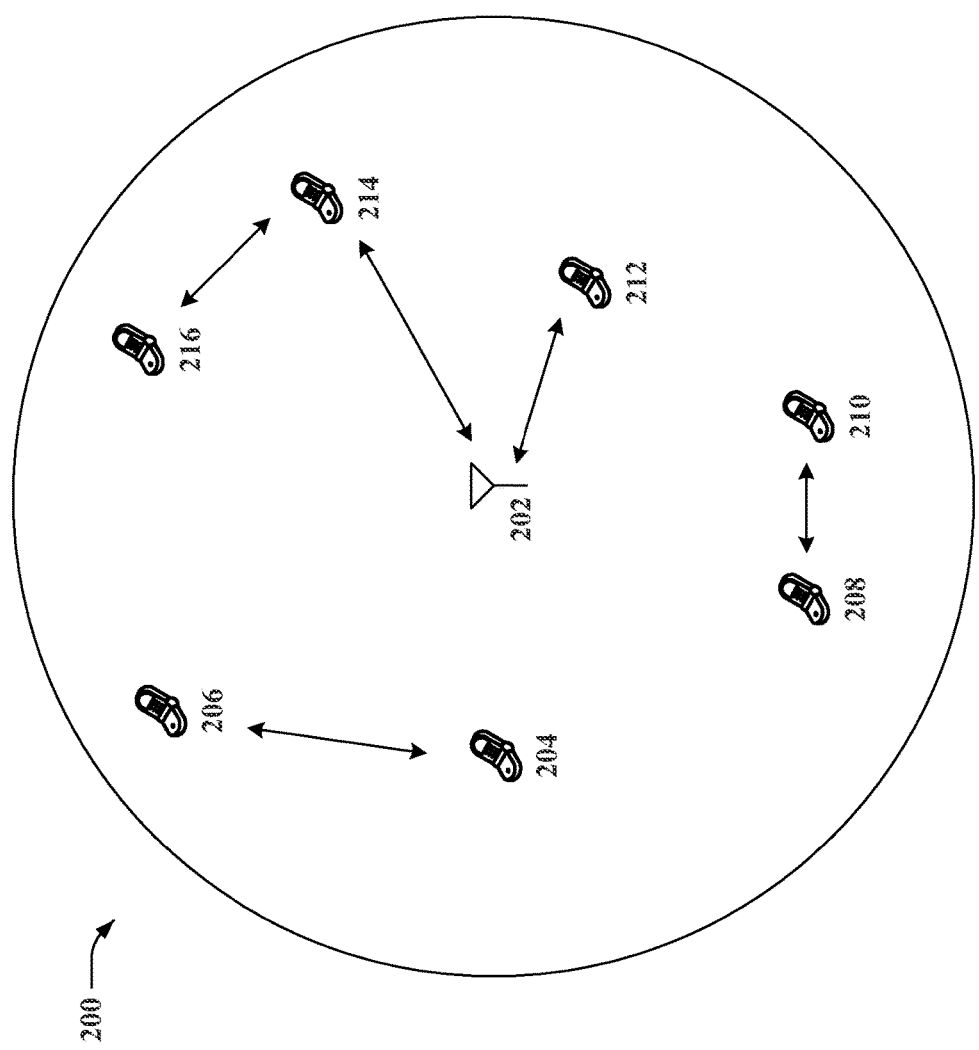
FIG. 2 is a drawing of an exemplary wireless wide area network and peer-to-peer communications system.

FIG. 2 is a drawing of an exemplary wireless wide area network (WAN) and peer-to-peer communications system 200. The wireless WAN and peer-to-peer communications system 200 includes a base station 202 and a plurality of wireless communications devices 204-216. Some of the wireless communications devices may communicate with the base station 202 through WAN communication and some of the wireless communication devices may communication with other wireless communication devices through peer-to-peer communication. For example, as shown in FIG. 2, wireless communication devices 204, 206 are in peer-to-peer communication, wireless communication devices 208, 210 are in peer-to-peer communication, and wireless communication devices 214, 216 are in peer-to-peer communication. In addition, wireless communication devices 212, 214 are in WAN communication with the base station 202.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems within a cellular network.

Figure 3:
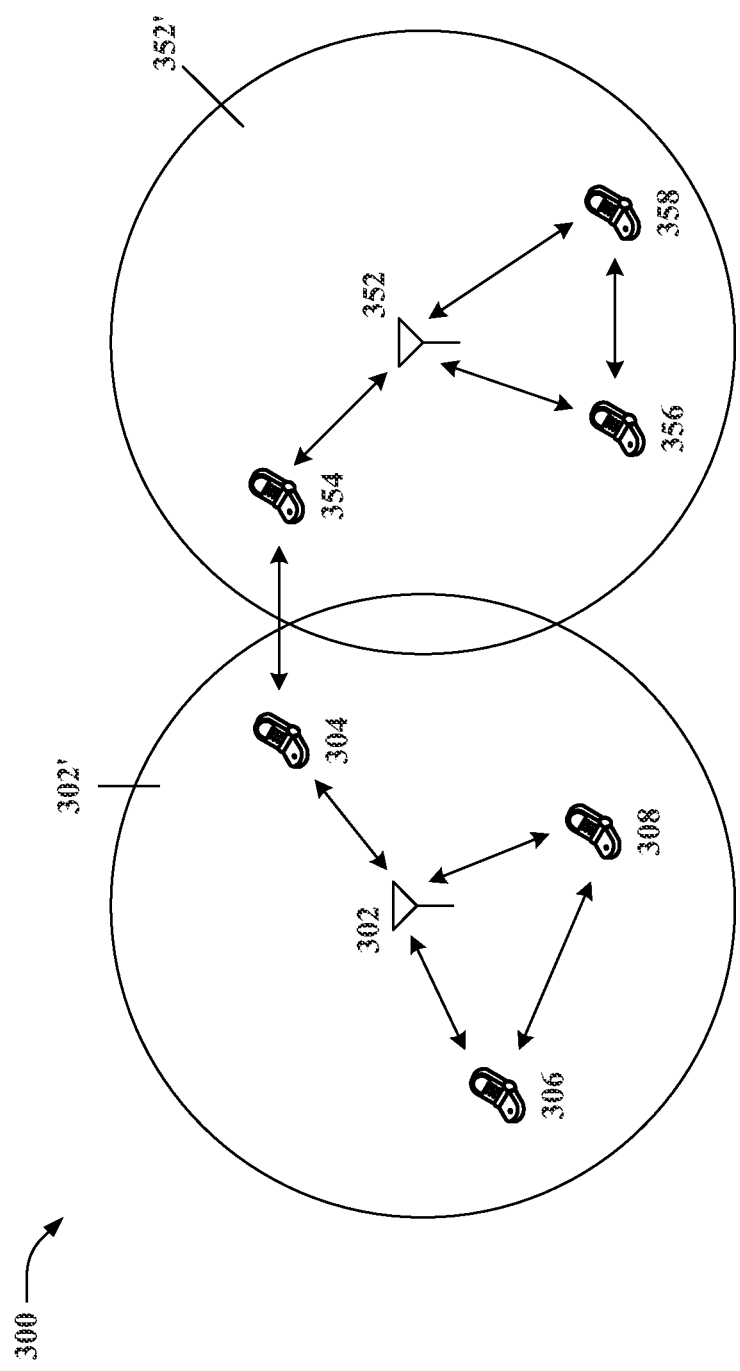
FIG. 3 is a diagram illustrating wireless communication devices in wide area network and peer-to-peer communications.

FIG. 3 is a diagram 300 illustrating wireless communication devices in WAN and peer-to-peer communications. As shown in FIG. 3, the wireless communication devices 304, 306, 308 may be in communication with the base station 302 and the wireless communication devices 354, 356, 358 may be in communication with the base station 352. In addition, the wireless communication devices 306, 308, the wireless communication devices 356, 358, and the wireless communication devices 304, 354 may be in peer-to-peer communication with each other. That is, the wireless communication devices 306, 308 may be in intracell peer-to-peer communication within the cell 302' of the base station 302, the wireless communication devices 356, 358 may be in intracell peer-to-peer communication within the cell 352' of the base station 352, and the wireless communication devices 304, 354 may be in intercell peer-to-peer communication between the cells 302', 352' of the base stations 302, 352, respectively.

In a WAN scenario, all communications between wireless communication devices utilize uplink and downlink channels between the wireless communication devices and the serving base station. As such, communications between the wireless communication devices 306, 308 would go through the base station 302. If two wireless communication devices are in the vicinity of each other, they may communicate directly through peer-to-peer communication without the communication going through the base station. As such, the wireless communication devices 306, 308 may communicate directly with each other using peer-to-peer communication without utilizing the base station 302 for the communication. Two wireless communication devices in different cells may also communicate using peer-to-peer communication. For example, wireless communication devices 304, 354 may communicate using peer-to-peer communication without the communication traveling through the base stations 302, 352.

One important feature of peer-to-peer communication is reuse, i.e., multiple peer-to-peer links that do not interfere with each other may communicate on the same resource. For example, if a first link including the wireless communication devices 306, 308 and a second link including the wireless communication devices 304, 354 do not interfere with each other, the first link and the second link may use the same resources for the peer-to-peer communication. One way to enable peer-to-peer communication between wireless communication devices in a WAN is to allocate periodic peer-to-peer resources within the WAN spectrum that are to be used only for peer-to-peer communication. In the allocated peer-to-peer resources, smart scheduling mechanisms may be utilized to allow multiple peer-to-peer links to compete and to be scheduled, thus enabling reuse. To enable the intercell peer-to-peer communication, the base stations 302, 352 may allocate the same resources in time and frequency for the peer-to-peer communication. To ensure that the allocated identical resources are aligned, the base stations 302, 352 may be synchronized.

Figure 4:
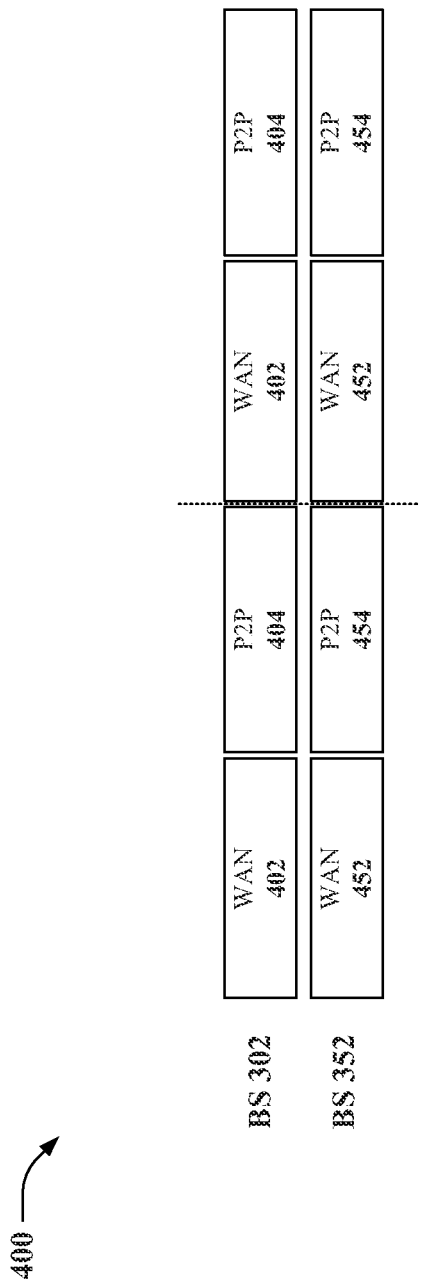
FIG. 4 is a diagram illustrating allocated wide area network and peer-to-peer resources for two synchronized base stations.

FIG. 4 is a diagram 400 illustrating allocated wide area network and peer-to-peer resources for the two synchronized base stations 302, 352. As shown in FIG. 4, the base station 302 has allocated periodic resources including WAN resources 402 and orthogonal peer-to-peer resources 404 and the base station 352 has allocated periodic resources including WAN resources 452 and orthogonal peer-to-peer resources 454. The base stations 302, 354 have allocated the same resources for peer-to-peer communication. The peer-to-peer resources 404 and the peer-to-peer resources 454 are identical resources and are aligned to allow for intercell peer-to-peer communication.

Such an allocation of resources can lead to undesirable dependencies. For example, based on peer-to-peer communication and WAN communication loads, the base station 302 may be able to maximize communication and resource use efficiency by utilizing only 20% of its resources for peer-to-peer communication, and the base station 352 may be able to maximize communication and resource use efficiency by utilizing 80% of its resources for peer-to-peer communication. The coordination in peer-to-peer resource allocation between the base stations 302, 352 may result in use of 50% of their resources for peer-to-peer communication, thus resulting in a reduced communication and resource use efficiency for each of the base stations 302, 352. As such, allocating the same resources for all peer-to-peer communication may be undesirable.

Figure 5:
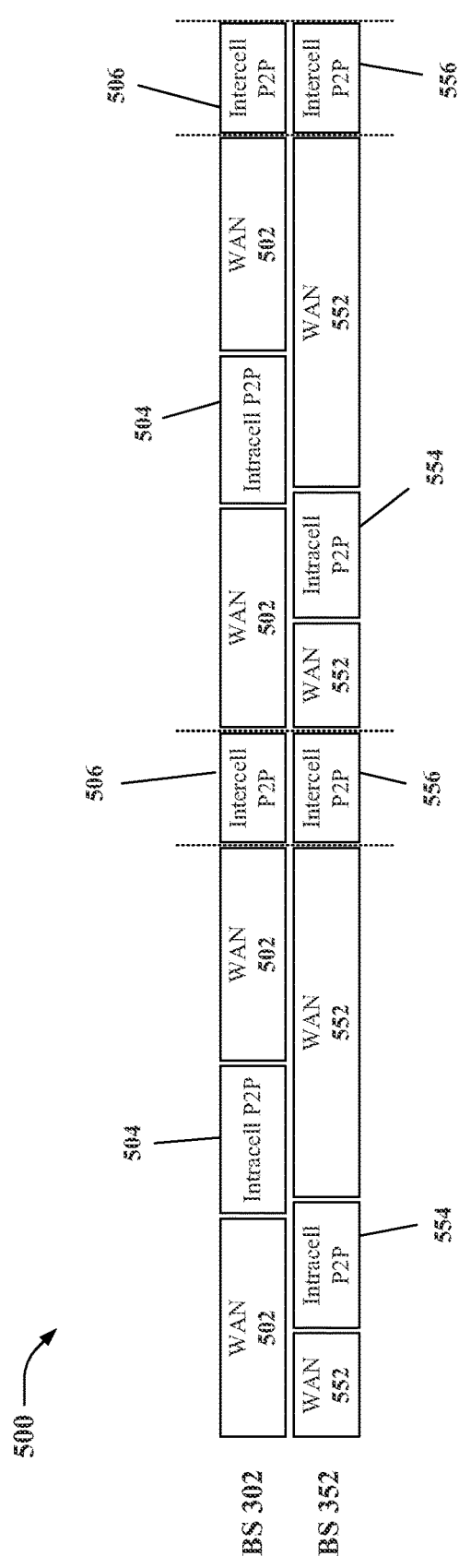
FIG. 5 is a diagram illustrating exemplary allocated wide area network and peer-to-peer resources for the two synchronized base stations.

FIG. 5 is a diagram 500 illustrating exemplary allocated WAN and peer-to-peer resources for the two synchronized base stations 302, 352. As shown in FIG. 5, the base station 302 has allocated periodic resources including WAN resources 502, orthogonal intracell peer-to-peer resources 504, and orthogonal intercell peer-to-peer resources 506, and the base station 352 has allocated periodic resources including WAN resources 552, orthogonal intracell peer-to-peer resources 554, and orthogonal intercell peer-to-peer resources 556. The base stations 302, 352 may communicate in order to coordinate allocation of identical intercell peer-to-peer resources, and therefore the intercell peer-to-peer resources 506, 556 may utilize the same frequency resources and be aligned in time. The base stations 302, 352 may each send information informing the wireless communication devices within their respective cells of the resources allocated for intercell peer-to-peer communication. The base stations 302, 354 may select the time period length of the intercell peer-to-peer resources 506, 556 based on an intercell peer-to-peer load between the cells 302', 352' and a WAN load of each of the cells 302', 352'. The intercell peer-to-peer load may be based on a number of intercell peer-to-peer links between the cells 302', 352'. A lower WAN load and a higher intercell peer-to-peer load may dictate a greater proportion of intercell peer-to-peer resources.

Each of the base stations 302, 352 may independently allocate its own intracell peer-to-peer resources. The base stations 302, 352 may each send information informing the wireless communication devices within their respective cells of the resources allocated for intracell peer-to-peer communication. The intracell peer-to-peer resources may utilize the same frequency resources, but need not be aligned in time. The base stations 302, 352 may select the time period length of the intracell peer-to-peer resources based on an intracell peer-to-peer load and its own WAN load. The intracell peer-to-peer load for the cell 302' may be determined based on a number of intracell peer-to-peer links within the cell 302' and the intracell peer-to-peer load for the cell 352' may be determined based on a number of intracell peer-to-peer links within the cell 352'. Alternatively, rather than based on a number of intracell peer-to-peer links, the intracell peer-to-peer load may be determined based on traffic characteristics, such as a quality of service (QoS) requirement, a data throughput requirement, an actual data throughput, a delay, and/or a jitter (i.e., variability in an ability to transmit). A lower WAN load and a higher intracell peer-to-peer load may dictate a greater proportion of intracell peer-to-peer resources. Furthermore, a higher QoS requirement, a higher data throughput requirement, a lower actual data throughput, a higher delay, and/or a higher jitter with respect to peer-to-peer communication may dictate a greater proportion of intracell peer-to-peer resources.

Because the intracell peer-to-peer resources 504, 554 may not be aligned in time, the intracell peer-to-peer resources 504, 554 may be utilized only for intracell peer-to-peer communication. For example, the link including the wireless communication devices 306, 308 may utilize the intracell peer-to-peer resources 504 and the link including the wireless communication devices 356, 358 may utilize the intracell peer-to-peer resources 554. However, the link including the wireless devices 304, 354 may not utilize the intracell peer-to-peer resources 504 or the intracell peer-to-peer resources 554.

On the other hand, the intercell peer-to-peer resources 506, 556 may be utilized for both intercell and intracell peer-to-peer communication. In one configuration, links may participate in intracell peer-to-peer communication using the intercell peer-to-peer resources with a lower priority than the links would otherwise have if they were participating in intercell peer-to-peer communication. In such a configuration, the links participating in intracell peer-to-peer communication using intercell peer-to-peer resources may be assigned resource that dictate a lower medium access priority for the link. For example, the link including the wireless communication devices 306, 308 may utilize the intercell peer-to-peer communication resources 506 with a lower medium access priority than the link including the wireless communication devices 304, 354.

Figure 6:
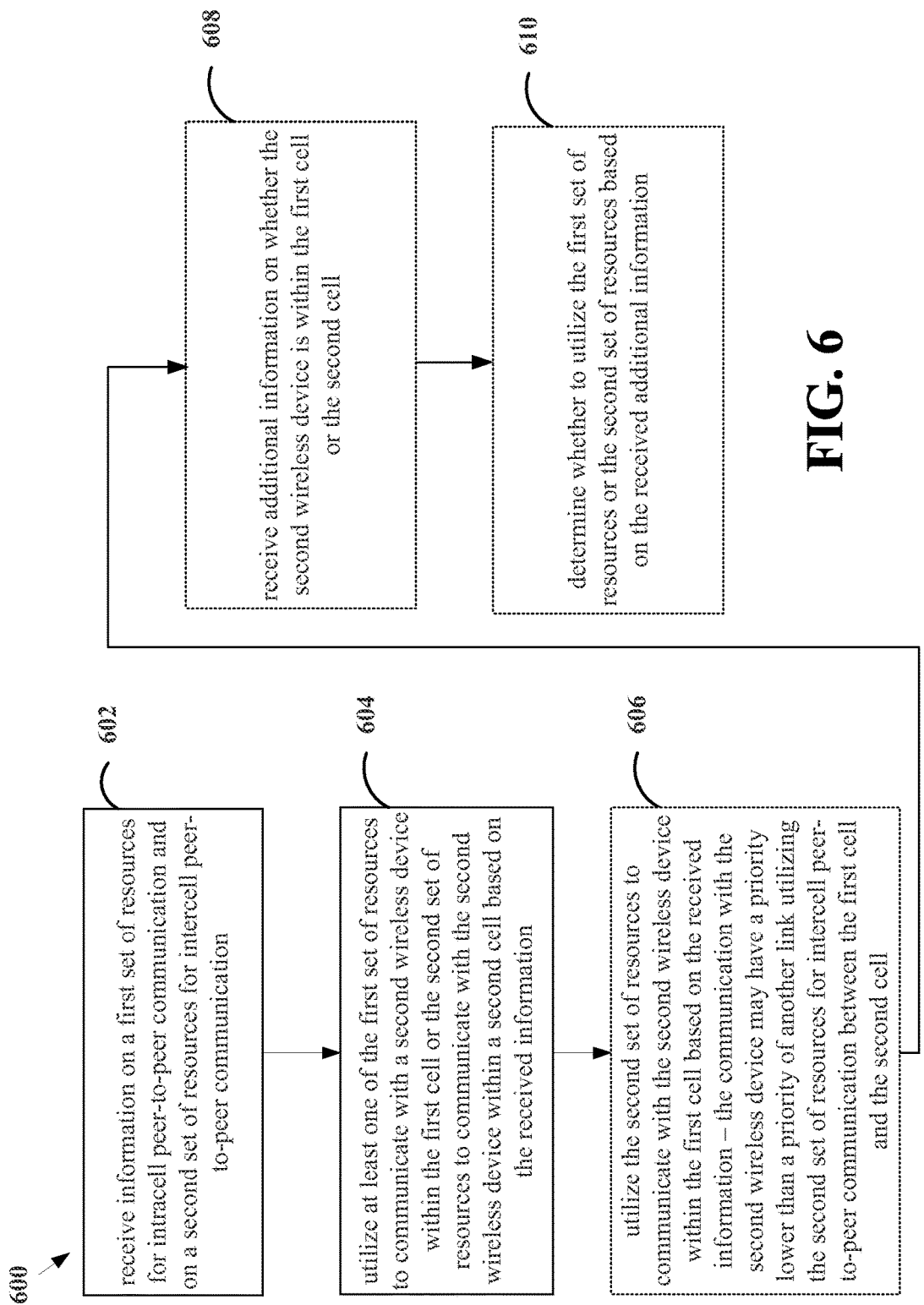
FIG. 6 is a flow chart of a method of wireless communication.

FIG. 6 is a flow chart 600 of an exemplary method. The method is performed by a wireless communication device 100 associated with a first cell. As shown in FIG. 6, the wireless device 100 receives information on a first set of resources for intracell peer-to-peer communication and on a second set of resources for intercell peer-to-peer communication (602). In addition, the wireless device 100 utilizes at least one of the first set of resources to communicate with a second wireless device within the first cell or the second set of resources to communicate with the second wireless device within a second cell based on the received information (604). For example, the wireless device 304 may receive information on the intracell peer-to-peer resources 504 and the intercell peer-to-peer resources 506 from the base station 302. Based on the received information, the wireless device 304 may utilize the intracell peer-to-peer resources 504 to communicate with the wireless device 308 when the wireless device 308 is within the cell 302' or may utilize the intercell peer-to-peer resources 506 to communicate with the wireless device 308 when the wireless device 308 is within the cell 352'.

The wireless device 100 may utilize the second set of resources to communicate with the second wireless device within the first cell based on the received information (606). In one configuration, the communication with the second wireless device may have a priority lower than a priority of another link utilizing the second set of resources for intercell peer-to-peer communication between the first cell and the second cell (606). For example, the wireless device 304 may utilize the intercell peer-to-peer resources 506 to communicate intracell with the wireless device 308. In such a situation, the medium access priority for the link including the wireless devices 304, 308 may be lower than medium access priorities for other links participating concurrently in intercell peer-to-peer communication on the intercell peer-to-peer resources 506.

The wireless device 100 may receive updated information on at least one of the first set of resources for intracell peer-to-peer communication or the second set of resources for intercell peer-to-peer communication. In addition, the wireless device 100 may utilize at least one of the first or second sets of resources based on the updated information. The wireless device 100 may receive additional information on whether the second wireless device is within the first cell or the second cell (608) and may determine whether to utilize the first set of resources or the second set of resources based on the received additional information (610). For example, the wireless device 304 may receive information from the base station 302, the wireless device 308, or another device on whether the wireless device 308 is within the cell 302' or the cell 352' and may determine whether to utilize the intracell peer-to-peer resources 504 or the intercell peer-to-peer resources 506 based on the received information. If the wireless device 308 is not within the cell 302', the wireless device 304 may utilize the intercell peer-to-peer resources 506 to communicate with the wireless device 308. If the wireless device 308 is within the cell 302', the wireless device 304 may utilize the intracell peer-to-peer resources 504 to communicate with the wireless device 308 or, with a lower relative priority to other intercell links concurrently utilizing the intercell peer-to-peer resources 506, the intercell peer-to-peer resources 506 to communicate with the wireless device 308.

The wireless device 100 may receive updated additional information on whether the second wireless device is within the first cell or the second cell. In such a configuration, the wireless device 100 may determine whether to utilize the first or second set of resources based on the updated additional information. The received information on the second set of resources may be based on coordination between the first cell and the second cell. The first set of resources may be based on an intracell peer-to-peer load within the first cell and a cellular (e.g., WAN) load of the first cell and the second set of resources may be based on an intercell peer-to-peer load of the first and second cells and a cellular load of the first and second cells. The intracell peer-to-peer load may be based on a number of intracell peer-to-peer links within the first cell and the intercell peer-to-peer load may be based on a number of intercell peer-to-peer links between the first cell and the second cell. The intracell peer-to-peer load may be based on traffic characteristics.

Figure 7:
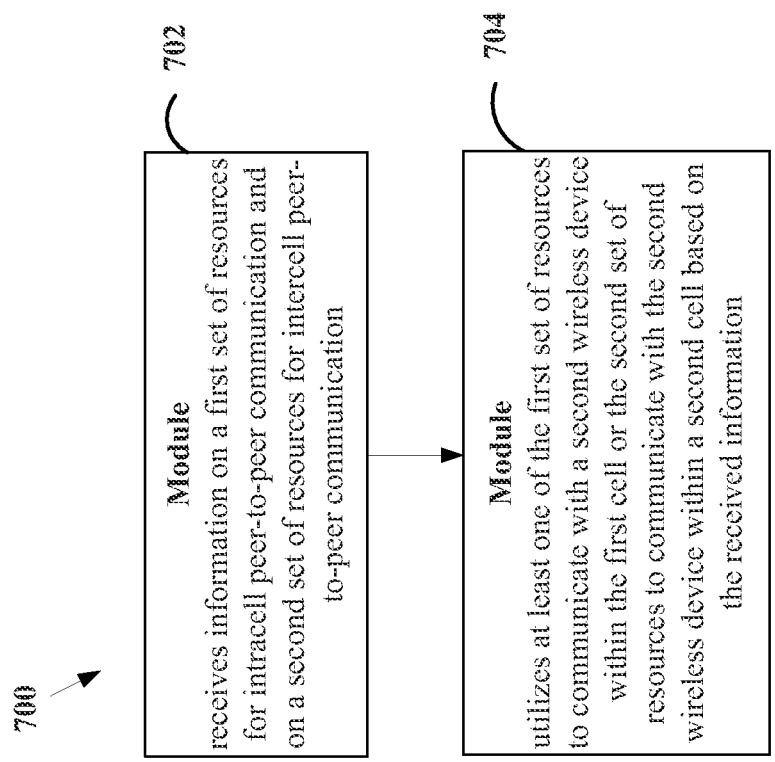
FIG. 7 is a conceptual block diagram illustrating the functionality of an exemplary apparatus.

FIG. 7 is a conceptual block diagram 700 illustrating the functionality of an exemplary apparatus 100. The apparatus 100 is a wireless device associated with a first cell. The apparatus 100 includes a module 702 that receives information on a first set of resources for intracell peer-to-peer communication and on a second set of resources for intercell peer-to-peer communication. In addition, the apparatus 100 includes a module 704 that utilizes at least one of the first set of resources to communicate with a second wireless device within the first cell or the second set of resources to communicate with the second wireless device within a second cell based on the received information.

Referring to FIG. 1, in one configuration, the apparatus 100 for wireless communication includes means for receiving information on a first set of resources for intracell peer-to-peer communication and on a second set of resources for intercell peer-to-peer communication. In addition, the apparatus 100 includes means for utilizing at least one of the first set of resources to communicate with a second wireless device within the first cell or the second set of resources to communicate with the second wireless device within a second cell based on the received information. In one configuration, the apparatus 100 includes means for utilizing the second set of resources to communicate with the second wireless device within the first cell based on the received information. In one configuration, the apparatus 100 includes means for receiving updated information on at least one of the first set of resources for intracell peer-to-peer communication or the second set of resources for intercell peer-to-peer communication. In one configuration, the apparatus 100 includes means for receiving additional information on whether the second wireless device is within the first cell or the second cell, and means for determining whether to utilize the first set of resources or the second set of resources based on the received additional information. In one configuration, the apparatus 100 includes means for receiving updated additional information on whether the second wireless device is within the first cell or the second cell. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device associated with a first cell of a first base station, comprising:
   receiving information on a first set of resources dedicated for intracell peer-to-peer communication and on a second set of resources dedicated for at least intercell peer-to-peer communication, the first set of resources being different from the second set of resources and being in a different time period than the second set of resources, wherein intercell peer-to-peer communication on the second set of resources has a higher medium access priority than intracell peer-to-peer communication on the second set of resources; and
   utilizing the first set of resources dedicated for intracell peer-to-peer communication when communicating with a second wireless device within the first cell of the first base station and the second set of resources dedicated for at least intercell peer-to-peer communication when communicating with the second wireless device within a second cell of a second base station that is different from the first base station based on the received information.

2. The method of claim 1, further comprising utilizing the second set of resources to communicate with the second wireless device within the first cell based on the received information.

3. The method of claim 2, wherein the communication with the second wireless device has a priority lower than a priority of another link utilizing the second set of resources for intercell peer-to-peer communication between the first cell and the second cell.

4. The method of claim 1, further comprising receiving updated information on at least one of the first set of resources for intracell peer-to-peer communication or the second set of resources for intercell peer-to-peer communication, wherein the utilizing is based on the updated information.

5. The method of claim 1, further comprising:
   receiving additional information on whether the second wireless device is within the first cell or the second cell; and
   determining whether to utilize the first set of resources or the second set of resources based on the received additional information.

6. The method of claim 5, further comprising receiving updated additional information on whether the second wireless device is within the first cell or the second cell, wherein the determining is based on the updated additional information.

7. The method of claim 1, wherein the received information on the second set of resources is based on coordination between the first cell and the second cell.

8. The method of claim 1, wherein the first set of resources is based on an intracell peer-to-peer load within the first cell and a cellular load of the first cell and the second set of resources is based on an intercell peer-to-peer load of the first and second cells and a cellular load of the first and second cells.

9. The method of claim 8, wherein the intracell peer-to-peer load is based on a number of intracell peer-to-peer links within the first cell and the intercell peer-to-peer load is based on a number of intercell peer-to-peer links between the first cell and the second cell.

10. The method of claim 8, wherein the intracell peer-to-peer load is based on traffic characteristics.

11. The method of claim 1, wherein the second set of resources is dedicated for intercell peer-to-peer communication and intracell peer-to-peer communication.

12. The method of claim 1, wherein the second set of resources is dedicated for intercell peer-to-peer communication only.

13. The method of claim 1, further comprising determining whether to utilize the first set of resources for intracell peer-to-peer communication or the second set of resources for intercell peer-to-peer communication for peer-to-peer communication with the second wireless device based on whether the second wireless device is associated with the first cell or the second cell, wherein the first set of resources for intracell peer-to-peer communication is utilized when the second wireless device is associated with the first cell, and the second set of resources for intercell peer-to-peer communication is utilized when the second wireless device is associated with the second cell.

14. The method of claim 1, wherein the second set of resources is dedicated for at least intercell peer-to-peer communication within the first cell of the first base station and within the second cell of the second base station.

15. An apparatus associated with a first cell of a first base station for wireless communication, comprising:
   a memory; and
   at least one processor coupled to the memory and configured to:
      receive information on a first set of resources dedicated for intracell peer-to-peer communication and on a second set of resources dedicated for at least intercell peer-to-peer communication, the first set of resources being different from the second set of resources and being in a different time period than the second set of resources, wherein intercell peer-to-peer communication on the second set of resources has a higher medium access priority than intracell peer-to-peer communication on the second set of resources; and
      utilize the first set of resources dedicated for intracell peer-to-peer communication when communicating with a second apparatus within the first cell of the first base station and the second set of resources dedicated for at least intercell peer-to-peer communication when communicating with the second apparatus within a second cell of a second base station that is different from the first base station based on the received information.

16. The apparatus of claim 15, wherein the at least one processor is further configured to utilize the second set of resources to communicate with the second apparatus within the first cell based on the received information.

17. The apparatus of claim 16, wherein the communication with the second apparatus has a priority lower than a priority of another link utilizing the second set of resources for intercell peer-to-peer communication between the first cell and the second cell.

18. The apparatus of claim 15, wherein the at least one processor is further configured to receive updated information on at least one of the first set of resources for intracell peer-to-peer communication or the second set of resources for intercell peer-to-peer communication, wherein the at least one processor is configured to utilize at least one of the first set of resources or the second set of resources based on the updated information.

19. The apparatus of claim 15, wherein the at least one processor is further configured to:
  receive additional information on whether the second apparatus is within the first cell or the second cell; and
  determine whether to utilize the first set of resources or the second set of resources based on the received additional information.

20. The apparatus of claim 19, wherein the at least one processor is further configured to receive updated additional information on whether the second apparatus is within the first cell or the second cell, and wherein the at least one processor is further configured to determine whether to utilize the first set of resources or the second set of resources based on the updated additional information.

21. The apparatus of claim 15, wherein the received information on the second set of resources is based on coordination between the first cell and the second cell.

22. The apparatus of claim 15, wherein the first set of resources is based on an intracell peer-to-peer load within the first cell and a cellular load of the first cell and the second set of resources is based on an intercell peer-to-peer load of the first and second cells and a cellular load of the first and second cells.

23. The apparatus of claim 22, wherein the intracell peer-to-peer load is based on a number of intracell peer-to-peer links within the first cell and the intercell peer-to-peer load is based on a number of intercell peer-to-peer links between the first cell and the second cell.

24. The apparatus of claim 22, wherein the intracell peer-to-peer load is based on traffic characteristics.

25. The apparatus of claim 15, wherein the at least one processor is further configured to determine whether to utilize the first set of resources for intracell peer-to-peer communication or the second set of resources for intercell peer-to-peer communication for peer-to-peer communication with the second apparatus based on whether the second apparatus is associated with the first cell or the second cell, wherein the first set of resources for intracell peer-to-peer communication is utilized when the second apparatus is associated with the first cell, and the second set of resources for intercell peer-to-peer communication is utilized when the second apparatus is associated with the second cell.

26. The apparatus of claim 15, wherein the second set of resources is dedicated for at least intercell peer-to-peer communication within the first cell of the first base station and within the second cell of the second base station.

27. An apparatus associated with a first cell of a first base station, comprising:
  means for receiving information on a first set of resources dedicated for intracell peer-to-peer communication and on a second set of resources dedicated for at least intercell peer-to-peer communication, the first set of resources being different from the second set of resources and being in a different time period than the second set of resources, wherein intercell peer-to-peer communication on the second set of resources has a higher medium access priority than intracell peer-to-peer communication on the second set of resources; and
  means for utilizing the first set of resources dedicated for intracell peer-to-peer communication when communicating with a second apparatus within the first cell of the first base station and the second set of resources dedicated for at least intercell peer-to-peer communication when communicating with the second apparatus within a second cell of a second base station that is different from the first base station based on the received information.

28. The apparatus of claim 27, further comprising means for utilizing the second set of resources to communicate with the second apparatus within the first cell based on the received information.

29. The apparatus of claim 28, wherein the communication with the second apparatus has a priority lower than a priority of another link utilizing the second set of resources for intercell peer-to-peer communication between the first cell and the second cell.

30. The apparatus of claim 27, further comprising means for receiving updated information on at least one of the first set of resources for intracell peer-to-peer communication or the second set of resources for intercell peer-to-peer communication, wherein the means for utilizing utilizes at least one of the first set of resources or the second set of resources based on the updated information.

31. The apparatus of claim 27, further comprising:
  means for receiving additional information on whether the second apparatus is within the first cell or the second cell; and
  means for determining whether to utilize the first set of resources or the second set of resources based on the received additional information.

32. The apparatus of claim 31, further comprising means for receiving updated additional information on whether the second apparatus is within the first cell or the second cell, wherein the means for determining determines whether to utilize the first set of resources or the second set of resources based on the updated additional information.

33. The apparatus of claim 27, wherein the received information on the second set of resources is based on coordination between the first cell and the second cell.

34. The apparatus of claim 27, wherein the first set of resources is based on an intracell peer-to-peer load within the first cell and a cellular load of the first cell and the second set of resources is based on an intercell peer-to-peer load of the first and second cells and a cellular load of the first and second cells.

35. The apparatus of claim 34, wherein the intracell peer-to-peer load is based on a number of intracell peer-to-peer links within the first cell and the intercell peer-to-peer load is based on a number of intercell peer-to-peer links between the first cell and the second cell.

36. The apparatus of claim 34, wherein the intracell peer-to-peer load is based on traffic characteristics.

37. The apparatus of claim 27, further comprising means for determining whether to utilize the first set of resources for intracell peer-to-peer communication or the second set of resources for intercell peer-to-peer communication for peer-to-peer communication with the second apparatus based on whether the second apparatus is associated with the first cell or the second cell, wherein the first set of resources for intracell peer-to-peer communication is utilized when the second apparatus is associated with the first cell, and the second set of resources for intercell peer-to-peer communication is utilized when the second apparatus is associated with the second cell.

38. The apparatus of claim 27, wherein the second set of resources is dedicated for at least intercell peer-to-peer communication within the first cell of the first base station and within the second cell of the second base station.

39. A non-transitory computer-readable medium storing computer executable code for wireless communication by a wireless device associated with a first cell of a first base station, comprising code for:
  receiving information on a first set of resources dedicated for intracell peer-to-peer communication and on a second set of resources dedicated for at least intercell peer-to-peer communication, the first set of resources being different from the second set of resources and being in a different time period than the second set of resources, wherein intercell peer-to-peer communication on the second set of resources has a higher medium access priority than intracell peer-to-peer communication on the second set of resources; and utilizing the first set of resources dedicated for intracell peer-to-peer communication when communicating with a second wireless device within the first cell of the first base station and the second set of resources dedicated for at least intercell peer-to-peer communication when communicating with the second wireless device within a second cell of a second base station that is different from the first base station based on the received information.

40. The non-transitory computer-readable medium of claim 39, wherein the computer-readable medium further comprises code for utilizing the second set of resources to communicate with the second wireless device within the first cell based on the received information.

41. The non-transitory computer-readable medium of claim 40, wherein the communication with the second wireless device has a priority lower than a priority of another link utilizing the second set of resources for intercell peer-to-peer communication between the first cell and the second cell.

42. The non-transitory computer-readable medium of claim 39, wherein the computer-readable medium further comprises code for receiving updated information on at least one of the first set of resources for intracell peer-to-peer communication or the second set of resources for intercell peer-to-peer communication, wherein the code for utilizing utilizes at least one of the first set of resources or the second set of resources based on the updated information.

43. The non-transitory computer-readable medium of claim 39, wherein the computer-readable medium further comprises code for:
receiving additional information on whether the second wireless device is within the first cell or the second cell; and
determining whether to utilize the first set of resources or the second set of resources based on the received additional information.

44. The non-transitory computer-readable medium of claim 43, wherein the computer-readable medium further comprises code for receiving updated additional information on whether the second wireless device is within the first cell or the second cell, wherein the code for determining determines whether to utilize the first set of resources or the second set of resources based on the updated additional information.

45. The non-transitory computer-readable medium of claim 39, wherein the received information on the second set of resources is based on coordination between the first cell and the second cell.

46. The non-transitory computer-readable medium of claim 39, wherein the first set of resources is based on an intracell peer-to-peer load within the first cell and a cellular load of the first cell and the second set of resources is based on an intercell peer-to-peer load of the first and second cells and a cellular load of the first and second cells.

47. The non-transitory computer-readable medium of claim 46, wherein the intracell peer-to-peer load is based on a number of intracell peer-to-peer links within the first cell and the intercell peer-to-peer load is based on a number of intercell peer-to-peer links between the first cell and the second cell.

48. The non-transitory computer-readable medium of claim 46, wherein the intracell peer-to-peer load is based on traffic characteristics.

49. The non-transitory computer-readable medium of claim 39, wherein the non-transitory computer-readable medium further comprises code for determining whether to utilize the first set of resources for intracell peer-to-peer communication or the second set of resources for intercell peer-to-peer communication for peer-to-peer communication with the second wireless device based on whether the second wireless device is associated with the first cell or the second cell, wherein the first set of resources for intracell peer-to-peer communication is utilized when the second wireless device is associated with the first cell, and the second set of resources for intercell peer-to-peer communication is utilized when the second wireless device is associated with the second cell.

50. The non-transitory computer-readable medium of claim 39, wherein the second set of resources is dedicated for at least intercell peer-to-peer communication within the first cell of the first base station and within the second cell of the second base station.

* * * * *